United States Patent
Heo et al.

(10) Patent No.: US 9,912,581 B2
(45) Date of Patent: Mar. 6, 2018

(54) FLOW INHERITANCE

(71) Applicant: ELECTRONICS AND TELECOMMUNICATIONS RESEARCH INSTITUTE, Daejeon (KR)

(72) Inventors: Hwan-Jo Heo, Daejeon (KR); Nam-Seok Ko, Daejeon (KR)

(73) Assignee: ELECTRONICS AND TELECOMMUNICATIONS RESEARCH INSTITUTE, Dae jeon (KR)

( * ) Notice: Subject to any disclaimer, the term of this patent is extended or adjusted under 35 U.S.C. 154(b) by 151 days.

(21) Appl. No.: 14/813,648

(22) Filed: Jul. 30, 2015

(65) Prior Publication Data

US 2016/0065457 A1    Mar. 3, 2016

(30) Foreign Application Priority Data

Aug. 27, 2014    (KR) .......................... 10-2014-0112427

(51) Int. Cl.
  *H04L 12/721*   (2013.01)
  *H04L 12/755*   (2013.01)
  *H04L 12/715*   (2013.01)
  *H04L 12/741*   (2013.01)

(52) U.S. Cl.
  CPC ............. *H04L 45/38* (2013.01); *H04L 45/021* (2013.01); *H04L 45/64* (2013.01); *H04L 45/54* (2013.01)

(58) Field of Classification Search
  CPC ....... H04L 45/38; H04L 45/021; H04L 45/64; H04L 45/54
  USPC .......................................... 370/351, 389, 392
  See application file for complete search history.

(56) References Cited

U.S. PATENT DOCUMENTS

| | | | |
|---|---|---|---|
| 2006/0013136 | A1* | 1/2006 | Goldschmidt .......... H04L 47/10 370/235 |
| 2013/0124707 | A1* | 5/2013 | Ananthapadmanabha .......................... H04L 45/7457 709/223 |
| 2014/0052836 | A1* | 2/2014 | Nguyen ................ H04L 45/306 709/223 |
| 2014/0112142 | A1 | 4/2014 | Ko et al. |
| 2014/0112150 | A1 | 4/2014 | Ko et al. |
| 2015/0312118 | A1* | 10/2015 | Behera .................... H04L 45/26 370/241 |

FOREIGN PATENT DOCUMENTS

| | | | |
|---|---|---|---|
| KR | 1020140052847 A | 5/2014 | |
| KR | 1020140052848 A | 5/2014 | |

* cited by examiner

*Primary Examiner* — Obaidul Huq
(74) *Attorney, Agent, or Firm* — Ladas & Parry LLP

(57) ABSTRACT

The present invention relates to a network device that supports software defined networking (SDN) and a packet processing method in the network device. The network device in accordance with the present invention includes: a flow table configured to store a processing action for each flow; and a packet processing module configured to search the flow table for a flow entry matched with a packet being received to determine a list of processing actions for the packet. Here, the packet processing module is configured to use inheritance relationship information between flows defined in the flow table to generate an action list that includes one or more actions for the packet in order to determine the processing actions for the packet.

9 Claims, 6 Drawing Sheets

```
update_stat(stat_structure s) <
  update counters in s;

if (s->stat_pointer)
    update_stat(s->stat_pointer):
}
              -ORupdate_stat(stat_structure s) {
  if (s->stat_pointer)
    update_stat(s->stat_pointer);

update counters in s;
}
```

FIG. 5B

```
update_action(action_structure a) {
  non-overwrite actions in a to action_list if (a->action_pointer)
    update_action(a->action_pointer);
}
            -ORupdate_action(action_structure a) {
  if (a->action_pointer)
    update_action(a->action_pointer);

overwrite actions in a to action list;
}
```

FIG. 6B

| Flow Entry | Match rules | Actions | Match precedence |
|---|---|---|---|
| FE$_1$ | <DST IP>=10.1.1.0/24 | <Push-Tag> VLAN ID=10<br><Output> Port=3 | 1 |
| FE$_2$ | <DST IP>=10.1.1.0/24<br><SRC IP>=10.1.2.64/26 | <Output> Port=7 | 10 |
| FE$_3$ | <DST IP>=10.1.1.0/24<br><SRC IP>=10.1.2.64/26<br><DST PORT>=80 | <Rate-Limit> Octets=10Mbps | 99 |

FLOW INHERITANCE

CROSS-REFERENCE TO RELATED APPLICATIONS

This application claims the benefit of Korean Patent Application No. 10-2014-0112427, filed with the Korean Intellectual Property Office on Aug. 27, 2014, the disclosure of which is incorporated herein by reference in its entirety.

BACKGROUND

1. Technical Field

The present invention relates to a network device and a packet processing method in the network device, more specifically to processing a packet in a network device that implements the software-defined networking (SDN).

2. Background Art

The SDN technology, which has received much attention recently, has a simple architecture which decouples the control plane from the data plane. The control plane (e.g., a SDN controller) has most of intelligences and the data plane (or a network device such as a switch or a router) processes packets according to flow process actions provided from the control plane through a standardized protocol such as Open-Flow.

The network device registers the flow process actions provided by the control plane in a flow table, which basically stores the match rule, actions and statistical counters for each flow as a single entry.

Nevertheless, since the conventional flow table does not support relationship between flow entries, it has been difficult to manage related flow entries efficiently.

SUMMARY

Accordingly, the exemplary embodiments of the present invention define an inheritance relationship between the flow entries to allow related flow entries to be managed more efficiently.

For this, the present invention suggests a flow table that allows one flow entry to inherit at least some fields of another flow entry.

A network device in accordance with an embodiment of the present invention includes: a flow table configured to store a list of processing actions for each flow; and a packet processing module configured to search the flow table for a flow entry matched with a packet being received to determine a list of processing actions for the packet, wherein the packet processing module is configured to use inheritance relationship information between the flows defined in the flow table to generate an action list that includes one or more actions for the packet in order to determine the processing actions for the packet.

In an embodiment, the packet processing module may be configured to generate the action list by copying the actions of the flow entry matched to the packet to the action list and adding the actions of another flow indicated by the action pointer in the flow entry to the action list according to a predefined condition.

The packet processing module may be configured to add each of the list of actions of said another flow to the action list only if the type of action included in the action list of said another flow is different from the type of actions already copied to the action list.

In an embodiment, the inheritance relationship information may include a statistics pointer that indicates a reference value indicating a set of statistics counters of another flow entry that inherits a set of statistics counters of the flow entry.

In an embodiment, the packet processing module may be configured to update a flow entry matched to the packet and also update the set of statistics counters of said another flow entry indicated by the statistics pointer of the flow entry.

A network device in accordance with an embodiment of the present invention includes: a memory having a flow table and a program stored therein, the flow table configured for storing a list of processing actions for each flow; and a processor coupled to the memory and configured to execute the program instructions stored in the memory, wherein, when executed by the processor, the program instructions cause the processor to search the flow table for a flow entry matched with a packet received by the network device and use inheritance relationship information included in the flow entry to generate an action list that includes one or more actions for the packet.

An embodiment of the present invention provides a method of processing a packet in a network device that includes: searching a flow table for a flow entry matched with a received packet; updating a set of statistics counters of the matched flow entry, and also updating a set of statistics counters of another flow entry inheriting the set of statistics counters of the flow entry by use of inheritance relationship information included in the flow entry; and processing the packet according to a list of actions of the matched flow entry.

Another embodiment of the present invention provides a method of processing a packet in a network device that includes: searching a flow table for a flow entry matched with a received packet; generating an action list including one or more actions for the packet by use of inheritance relationship information of the matched flow entry; and processing the packet according to the action list.

In an embodiment, the generation of the action list may include: copying the list of actions of the flow entry matched to the packet to the action list; and adding each of the list of actions of the another flow indicated by an action pointer included in the flow entry to the action list only if the type of action of said another flow is different from the type of actions already copied to the action list.

According to an embodiment of the present invention, polling the statistics counters or changing the actions of flows may be more efficient and consistent, by defining the inheritance relationships between the flow entries.

BRIEF DESCRIPTION OF DRAWINGS

FIG. 5B shows an example of pseudo codes defining the steps for generating the action list shown in FIG. 5A.

FIG. 6B shows a portion of a flow table including the 3 flow entries shown in FIG. 6A.

DETAILED DESCRIPTION

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention.

Throughout the description of the present invention, when describing a certain technology is determined to evade the point of the present invention, the pertinent detailed description will be omitted.

Unless otherwise stated, any expression in singular form in the description and the claims shall be interpreted to generally mean "one or more."

Moreover, any terms "module," "unit," "interface," etc. used in the description shall generally mean computer-related objects and can mean, for example, hardware, software and a combination thereof.

Furthermore, the terms "flow" and "flow entry" are interchangeably used in the present specification.

Hereinafter, certain embodiment of the present invention will be described in detail with reference to the accompanying drawings.

Figure 1:
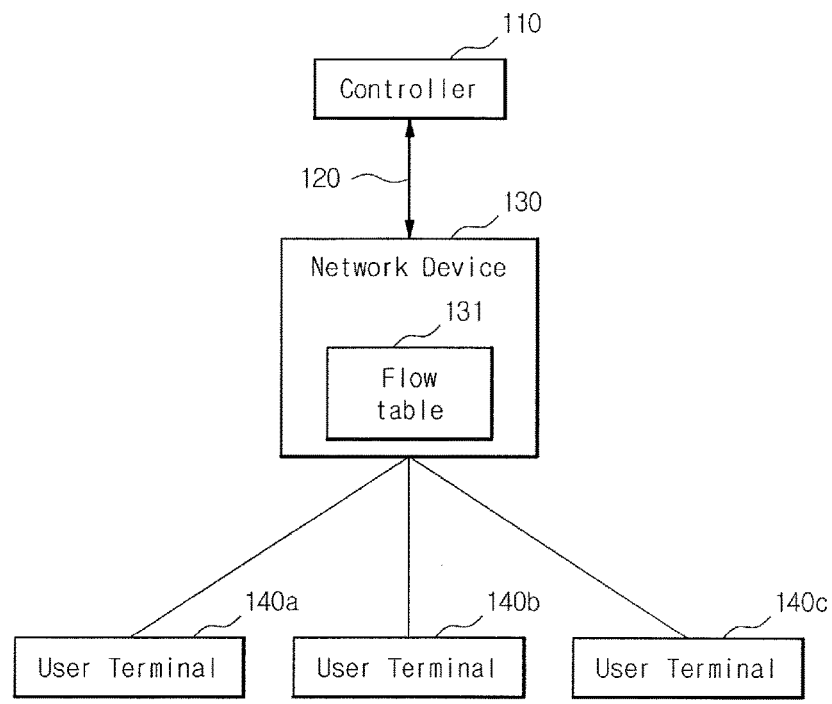
FIG. 1 is a brief diagram showing an SDN-based network structure.

FIG. 1 is a brief diagram showing an SDN-based network structure to which the present invention is applied.

As illustrated, the SDN-based network includes a controller 110, a channel 120, a network device 130 and user terminals 140a, 140b, 140c. Although FIG. 1 shows one controller and one network device only for the convenience of illustration, it shall be appreciated by those of ordinary skill in the art to which the present invention pertains that the present invention is not restricted to what is illustrated in FIG. 1 and that there exist a plurality of controllers and network devices in SDN-based network.

The controller 110 may communicate with the network device 130 through the channel 120 (e.g., an OpenFlow channel) and manage the network device 130. For example, the controller 110 may provide the network device 130 with flow information that defines a forwarding route of a packet.

The network device 130 is a communication device that is capable of communicating with the controller 110 and the user terminals 140a, 140b, 140c and may be, for example, a router, a switch, a bridge or any device performing a similar function thereof. Once a packet is received from the user terminals 140a, 140b, 140c, the network device 130 may process the packet (for example, transfer the packet to another user terminal) based on the flow information provided from the controller 110. The user terminals 140a, 140b, 140c are communication devices that are capable of communicating with another user terminal and may be, for example, desktop computers, notebook computers, mobile phones, tablet computers or any devices similar thereto.

Figure 2:
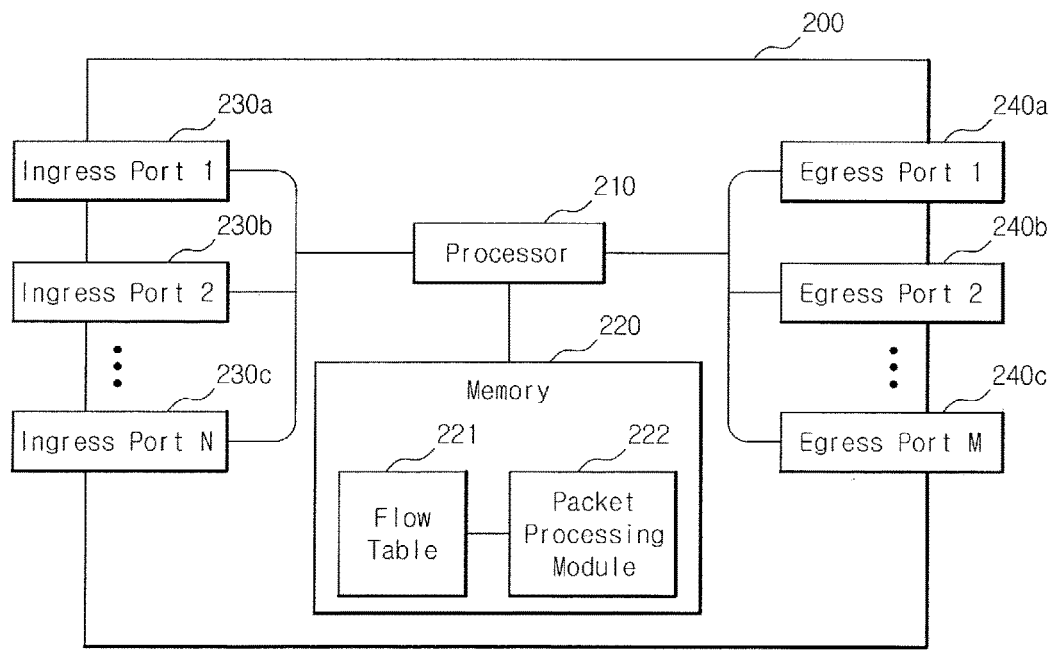
FIG. 2 is a block diagram showing the structure of a network device in accordance with an embodiment of the present invention.

FIG. 2 is a block diagram showing the structure of a network device in accordance with an embodiment of the present invention.

As illustrated, a network device 200 may include a processor 210, a memory 220 and a plurality of ingress ports 230a, 230b, 230c that receive packets and a plurality of egress ports 240a, 240b, 240c that transmit packets.

The processor 210 may be referred to as a central processing unit (CPU), communicate with the ingress ports 230a, 230b, 230c, the egress ports 240a, 240b, 240c and the memory 220, and execute program instructions stored in the memory. The processor may be implemented as one or more CPU chips, cores, FPGAs (field-programmable gate arrays), ASICs (application specific integrated circuits) and/or DSPs (digital signal processors).

The memory 220 may be a variety of types of non-volatile/volatile storage media and may be constituted with, for example, ROM, RAM, TCAM, SRAM or a combination thereof.

In an embodiment, the memory 220 has a flow table 221 and packet processing module 222 stored therein.

The flow table 221 is a table in which processing actions for each flow are defined and may store a flow identifier (e.g., a combination of packet header fields), statistics counters and actions for matched flow. The structure of the flow table suggested by the present invention will be described later with reference to FIG. 3.

The packet processing module 222 may be implemented with program instructions that are executable by the processor 210. In an embodiment, the packet processing module 222 may search the flow table 221 for a flow entry matched with an incoming packet and determine a processing action for the packet Here, the packet processing module 222 may use inheritance relationship information between flows defined by the present invention to generate an action list that consists of one or more actions.

Moreover, every time a flow matched with a packet is searched, the packet processing module 222 may update the statistics counters of the flow. Here, the packet processing module 222 may even use the inheritance relationship information between flows to update the statistics counters for every flow that inherits the matched flow.

Figure 3:
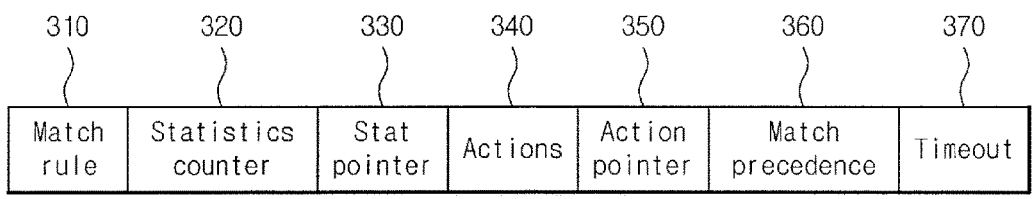
FIG. 3 shows the structure of an entry of a flow table in accordance with an embodiment of the present invention.

FIG. 3 shows the structure of an entry of a flow table in accordance with an embodiment of the present invention.

As illustrated, a flow entry 300 may include fields for match rule 310, statistics counter 320, statistics pointer 330, actions 340, action pointer 350, match precedence 360 and timeout 370.

The match rule 310 specifies header field conditions of packets that uniquely identify a flow.

The statistics counter 320 indicate the statistics information regarding the given flow entry including the number or the octet of packets matched with the flow and is often updated every time the packet is matched. In addition, although it is shown in FIG. 3 that the flow entry has only one statistics counter field, it may have a plurality of statistics counter fields, each of which indicates different type of statistics information.

The actions 340 define how the packets matched to the flow should be processed and also may include the jump instruction to another flow table in case that a plurality of flow tables exists.

The match precedence 360 defines an order of priority of flows in case a plurality of flows are matched to a single packet.

The timeout 370 defines a time condition at which the flow entry is removed.

The above-described fields of the flow entry are already defined in OpenFlow Switch Specification 1.4.0.

In addition, the present invention allows the inherited flow entries to be managed efficiently by defining the inheritance relationship between the flows. For example, the statistics counters and actions within the flow may inherit statistics counters and actions of another flow entry. For this, in case the packet is matched with a particular flow entry, the statistics counters of another flow entry that is in the inheritance relationship with the flow entry may be updated additionally, or the actions of said another flow entry may be taken.

In an embodiment, the inheritance relationship information between flows may be notified to a network device by a controller using an inheritance-aware protocol in the SDN-based network architecture.

As such, in order to define the inheritance relationship between the flows, the fields of the statistics pointer 330 and/or action pointer 350 may be added to the flow entry. Although FIG. 3 shows that both fields of the statistics pointer 330 and the action pointer 350 are added, it shall be apparent that this is only an example and that it is possible to add one of these fields, if necessary.

In an embodiment, the statistics pointer 330 is a reference value that indicates statistics counters of another flow entry that inherits the statistics counters of the flow entry.

In an embodiment, the action pointer 350 is a reference value of a flow entry that inherits the actions of the flow entry.

Figure 4A:
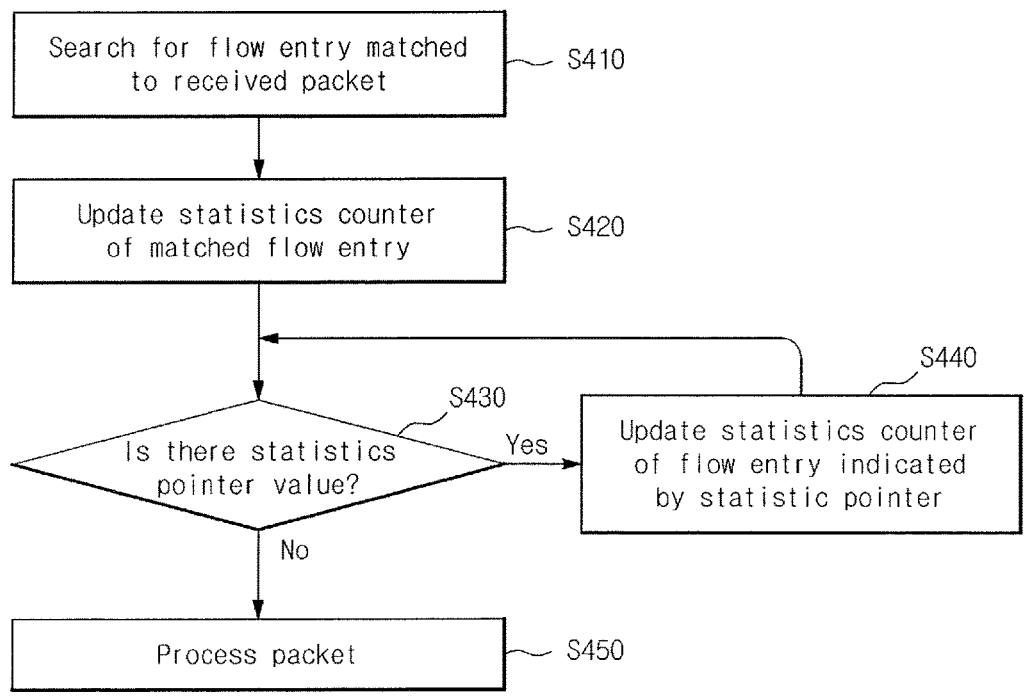
FIG. 4A is a flow diagram showing a packet processing method that includes the steps for updating statistics counters of a flow entry in accordance with an embodiment of the present invention.
Figures 4B, 5A:
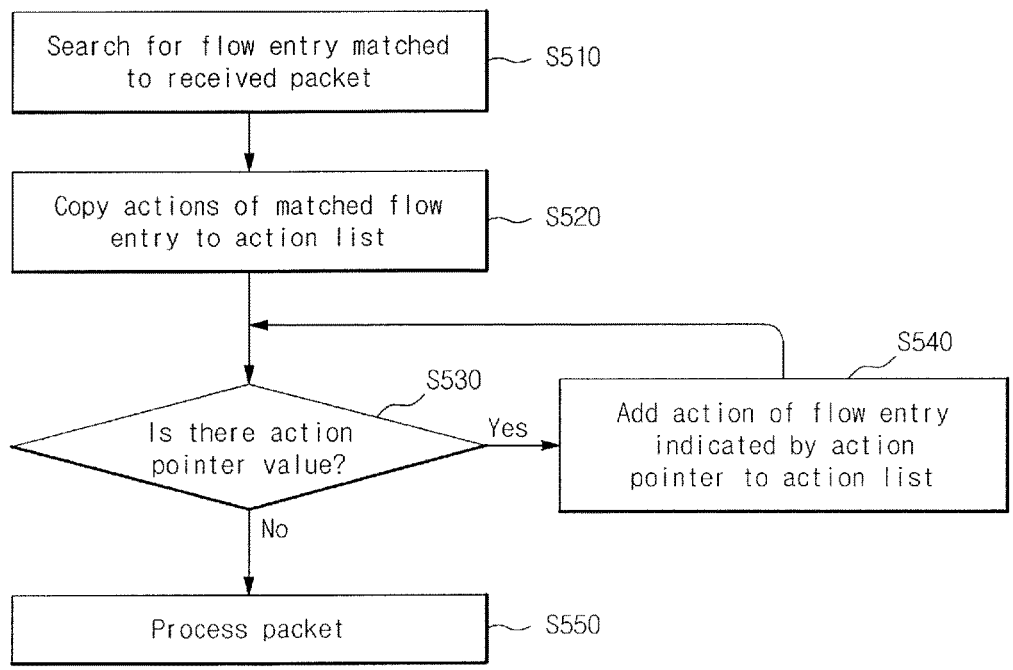
FIG. 4B shows an example of pseudo codes defining the steps for updating the statistics counters of the flow entry.
FIG. 5A is a flow diagram showing a packet processing method that includes the steps for generating an action list in accordance with an embodiment of the present invention.

FIG. 4A is a flow diagram showing a packet processing method that includes the steps for updating statistics counters of a flow entry in accordance with an embodiment of the present invention, and FIG. 4B shows an example of a pseudo code defining the steps for updating the statistics counters of the flow entry.

In S410, once a packet is received, a flow table is searched for a flow entry being matched to the received packet.

In S420, if the packet is matched to a particular flow entry in the flow table, statistics counters of the matched flow entry are updated.

In S430, it is determined whether there is a valid, in the sense that referring to another flow entry or its statistics counters, statistics pointer value in the matched flow entry.

In S440, if there is a valid statistics pointer value, the statistics counters of a flow entry indicated by the statistics pointer are also updated. These steps are repeated until the statistics pointer has an invalid or pre-designated value, meaning that no more inheritance relationship exists, in the flow entry indicated by the statistics pointer.

In S450, the packet is processed according to the actions of the matched flow entry.

Although it is described in the above embodiment that the statistics counters are updated prior to the processing of the packet, the present invention shall not be restricted to the above-described sequence, and it shall be apparent to those of ordinary skill in the art that the statistics counters may be updated after or simultaneously with the processing of the packet.

FIG. 5A is a flow diagram showing a packet processing method that includes the steps for generating an action list in accordance with an embodiment of the present invention, and FIG. 5B shows an example of a pseudo code defining the steps for generating the action list shown in FIG. 5A.

In S510, once a packet is received, a flow table is searched for a flow entry being matched to the received packet.

In S520, if the packet is matched to a particular flow entry, actions are extracted from the matched flow entry and copied to an action list <action_list>.

In S530, it is determined whether there is an action pointer value in the matched flow entry.

In S540, if there is an action pointer value, the actions of the flow entry indicated by the action pointer are added to the action list <action_list>. Here, if the action in the list of actions of the flow entry indicated by the action pointer is a same type of action that is already in the action list, the action may not be added to the action list, and the action may be added to the action list only if the action is a different type of action.

Alternatively, the action pointer of the flow entry may be recursively followed, and the actions may be copied starting from the action of the last flow entry. Here, the action list may be generated by overwriting a same type of action and adding different types of actions.

Here, the same type of action may refer to an action having a same instruction. For example, the types of actions may be identified according to instructions, such as "Output" for designating an output port and "Rate-limit" for limiting a bandwidth of a flow. In case, for example, an action of "<output> Port=7" is to be added while there is an action of "<output> Port=3" in the action list, the action is overwritten to the latter. Meanwhile, since "<Rate-Limit> Octets=10 Mbps" is not the same type of action, this action may be added to the action list. As a result, one or more actions that are defined in all flow entries having inheritance relationship with the flow entry matched to the packet are selectively stored in the action list.

In S550, the packet is processed according to the completed action list.

Hitherto, updating the statistics counters of a flow entry and generating the action list were described in separate embodiment with reference to FIG. 4 and FIG. 5, but these steps are described for easier understanding of the invention and may be performed at the same time for a same packet, depending on how the invention is embodied. Moreover, these steps may be implemented as program instructions stored in the memory 220 within the network device shown in FIG. 2 to be performed by a processor whenever the packets are received. Hereinafter, results of the above steps for 3 flow entries that are in inheritance relations will be described with reference to FIG. 6A and FIG. 6B.

Figure 6A:
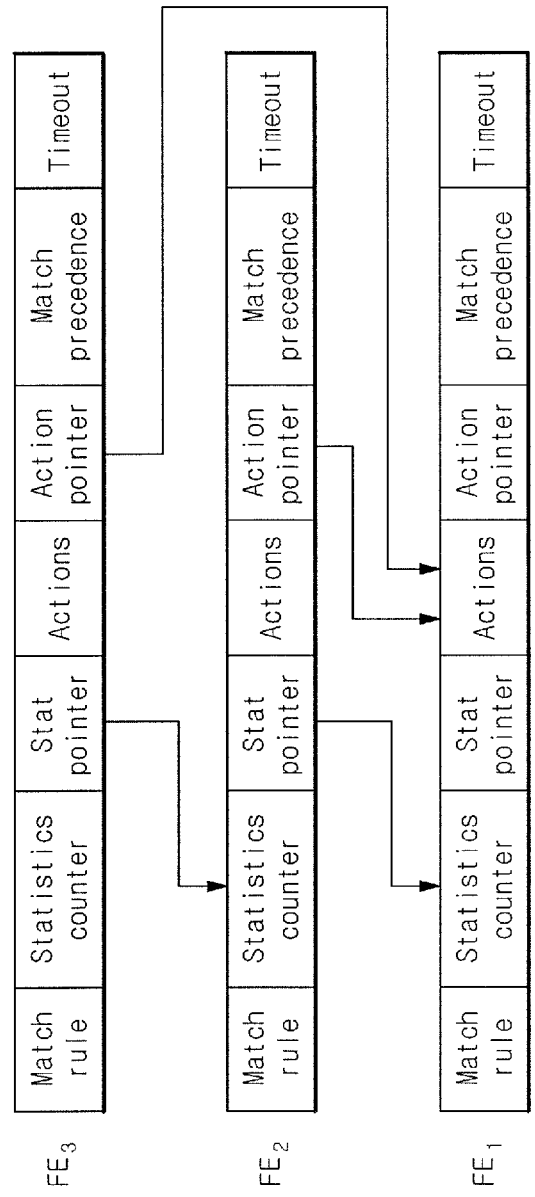
FIG. 6A is a conceptual diagram showing inheritance relations between 3 flow entries ($FE_1$, $FE_2$, $FE_3$) in accordance with an embodiment of the present invention.

FIG. 6A is a conceptual diagram showing inheritance relationship between 3 flow entries ($FE_1$, $FE_2$, $FE_3$) in accordance with an embodiment of the present invention, and FIG. 6B shows a portion of a flow table including the 3 flow entries shown in FIG. 6A.

According to the match rules, $FE_3$ belongs to $FE_2$, and $FE_2$ belongs to $FE_1$ ($FE_3 \subset FE_2 \subset FE_1$). $FE_3$ may be referred to as a sub-flow of $FE_2$ and $FE_1$, and $FE_2$ may be referred to as a sub-flow of $FE_1$. On the other hand, $FE_1$ may be referred to as a super-flow of $FE_2$ and $FE_3$, and $FE_2$ may be referred to as a super-flow of $FE_3$.

As illustrated in FIG. 6A, the inheritance relationship between the three flows are defined, and the flow entries are assumed to perform the actions described in FIG. 6B. As a result, actions of attaching a VLAN tag and outputting a packet to port number 3 will be performed for $FE_1$, and maintaining the VLAN tag but outputting the packet to port number 7 for $FE_2$, and maintaining the VLAN tag and outputting the packet to port number 3 (i.e., maintaining the action of $FE_1$), instead of port number 7, while limiting the bandwidth to 10 Mbps for $FE_3$. Moreover, every flow may maintain the statistics counter of including its sub-flow and sub-flow of the sub-flow.

By indicating the inheritance relationship by use of a pointer between the flow entries, the flow entries may not have duplicate actions and may be changed consistently even if their actions are changed. For example, if the VLAN tag ID were changed from 10 to 20, the conventional flow table would require that all three flow entries have an action of "<Push-Tag>VLAN ID=10" and be consistently changed when 10 is changed to 20. On the contrary, the present invention allows $FE_1$ only to have the action of "<Push-Tag> VLAN ID=10" and thus allows the actions of all flow entries to be changed by changing $FE_1$ only.

For the statistics counters, if the controller wanted the statistics counters of a flow, of which the destination is 10.1.1.0/24, the statistics counters of all three flows would be conventionally needed because the statistics counters of sub-flows had to be added as well. However, in the present invention, it is possible to efficiently bring the statistics counters of $FE_1$ only because the statistics counters of a super-flow can be updated through the inheritance relationships.

The apparatus and the method in accordance with an embodiment of the present invention may be implemented in the form of program instructions that are executable through various computer means and written in a computer-readable medium, which may include program instructions, data files, data structures, or the like, in a stand-alone form or in a combination thereof.

The program instructions stored in the computer readable medium can be designed and configured specifically for the present invention or can be publically known and available to those who are skilled in the field of software. Examples of the computer readable medium can include magnetic media, such as a hard disk, a floppy disk and a magnetic tape, optical media, such as CD-ROM and DVD, magneto-optical media, such as an optical disk, and hardware devices, such as ROM, RAM and flash memory, which are specifically configured to store and run program instructions. Moreover, the above-described media can be transmission media, such as optical or metal lines and a waveguide, which include a carrier wave that transmits a signal designating program instructions, data structures, etc. Examples of the program instructions can include machine codes made by, for example, a compiler, as well as high-language codes that can be executed by an electronic data processing device, for example, a computer, by using an interpreter.

Hitherto, certain embodiments of the present invention have been described, and it shall be appreciated that a large number of permutations and modifications of the present invention are possible without departing from the intrinsic features of the present invention by those who are ordinarily skilled in the art to which the present invention pertains. Accordingly, the disclosed embodiments of the present invention shall be appreciated in illustrative perspectives, rather than in restrictive perspectives, and the scope of the technical ideas of the present invention shall not be restricted by the disclosed embodiments. The scope of protection of the present invention shall be interpreted through the claims appended below, and any and all equivalent technical ideas shall be interpreted to be included in the claims of the present invention.

What is claimed is:

1. A network device comprising:
    a memory having one or more flow tables and a program stored therein, the flow tables configured for storing a list of processing actions for each flow; and
    a processor coupled to the memory and configured to execute the program instructions stored in the memory, wherein, when executed by the processor, the program instructions cause the processor to search the flow table for a flow entry matched with a packet received by the network device and use inheritance relations information included in the flow entry to generate an action list that includes one or more actions for the packet,
    wherein the inheritance relations information comprises information that indicates a referencing or dereferencing relationship between a plurality of the flow entries,
    wherein the inheritance relationship information comprises a statistics pointer that indicates a reference value indicating a statistics counter of another flow entry that inherits a statistics counter of the flow entry.

2. The network device of claim 1, wherein the inheritance relations information includes an action pointer that indicates a reference value indicating a set of actions of another flow entry that inherits a set of actions of the flow entry.

3. The network device of claim 2, wherein the program instructions further cause the processor to generate the action list by copying the actions of the flow entry matched to the packet to the action list and adding the actions of another flow indicated by the action pointer in the flow entry to the action list according to a predefined condition.

4. The network device of claim 3, wherein the actions of said another flow is added to the action list only if the type of action included in the action list of said another flow is different from the type of action copied to the action list.

5. The network device of claim 1, wherein the program instructions further cause the processor to update the statistics counter of a flow entry matched to the packet and also update the statistics counter of said another flow entry indicated by the statistics pointer of the flow entry.

6. A method of processing a packet in a network device, the method comprising:
    searching a flow table for a flow entry matched with a received packet;
    updating a set of statistics counters of the matched flow entry, and also updating a set of statistics counters of another flow entry inheriting the set of statistics counters of the flow entry by use of inheritance relationship information in the flow entry; and
    processing the packet according to a list of actions of the matched flow entry,
    wherein the inheritance relationship information comprises a statistics pointer that indicates a reference value indicating a set of statistics counters of said another flow entry that inherits the set of statistics counters of the flow entry.

7. A method of processing a packet in a network device, the method comprising:
    searching a flow table for a flow entry matched with a received packet;
    generating a list of actions that includes one or more actions for the packet in order to determine the processing actions for the packet using inheritance relationship information between flows defined in the flow table; and
    processing the packet according to the action list of the matched flow entry,
    wherein the inheritance relations information comprise information that indicates an inheritance relationship between a plurality of flow-entries, and wherein the inheritance relationship information comprises an action pointer that indicates a reference value indicating a list of actions of another flow entry that inherits a list of actions of the flow entry,
    wherein the inheritance relationship information comprises a statistics pointer that indicates a reference value indicating a statistics counter of another flow entry that inherits a statistics counter of the flow entry.

8. The method of claim 7, wherein generating the action list comprises copying the one or more actions of the flow entry matched to the packet to the action list and adding the one or more actions of another flow indicated by the action pointer in the flow entry to the action list according to a predefined condition.

9. The method of claim 8, wherein further comprises adding each of the list of actions of said another flow to the action list only if the type of action included in the action list of said another flow is different from the type of actions already copied to the action list.

* * * * *